United States Patent
Armbruster et al.

(10) Patent No.: US 10,316,896 B2
(45) Date of Patent: Jun. 11, 2019

(54) CENTERING SLEEVE FOR BEARING AND CENTERING A SHAFT END

(71) Applicant: Vibracoustic GmbH, Darmstadt (DE)

(72) Inventors: Timo Armbruster, Zell a. H. (DE); Frederik Goetz, Breisach (DE); Manuel Erdmann, Buggingen (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 15/313,978

(22) PCT Filed: May 26, 2015

(86) PCT No.: PCT/EP2015/061612
§ 371 (c)(1),
(2) Date: Nov. 25, 2016

(87) PCT Pub. No.: WO2015/181184
PCT Pub. Date: Dec. 3, 2015

(65) Prior Publication Data
US 2017/0159720 A1    Jun. 8, 2017

(30) Foreign Application Priority Data

May 27, 2014   (DE) ........................ 10 2014 107 483

(51) Int. Cl.
| F16C 11/06 | (2006.01) |
| F16D 3/76 | (2006.01) |
| F16F 1/37 | (2006.01) |
| F16F 1/373 | (2006.01) |

(52) U.S. Cl.
CPC ............ *F16D 3/76* (2013.01); *F16C 11/0671* (2013.01); *F16F 1/3732* (2013.01)

(58) Field of Classification Search
CPC .............. F16C 11/0604; F16C 11/0609; F16C 11/0671; F16C 11/0676; F16C 11/083; F16C 23/043; F16C 17/10; F16C 17/105; F16D 3/76; F16F 1/3732
See application file for complete search history.

(56) References Cited

U.S. PATENT DOCUMENTS 2,350,482 A * 6/1944 Venditty ............. F16C 11/0614
384/203
2,862,740 A * 12/1958 Alexander .......... F16C 11/0614
403/130

(Continued)

FOREIGN PATENT DOCUMENTS

| DE | 531912 C | 8/1931 |
| DE | 838841 C | 5/1952 |

(Continued)

*Primary Examiner* — Alan B Waits
(74) *Attorney, Agent, or Firm* — Leydig, Voit & Mayer, Ltd.

(57) ABSTRACT

A centering sleeve for bearing and centering a shaft end includes an inner bushing having passages. An outer bushing surrounds the inner bushing. A spring element made of an elastomer is arranged between the inner bushing and the outer bushing. The spring element has a sealing lip. The elastomer passes through the passages of the inner bushing so as to create an interlocking connection between the spring element and the inner bushing.

18 Claims, 3 Drawing Sheets

(56) References Cited

U.S. PATENT DOCUMENTS

| | | | | |
|---|---|---|---|---|
| 2,879,091 | A | * | 3/1959 | Baker ................ F16C 11/0619 403/124 |
| 3,342,513 | A | * | 9/1967 | Melton ............... F16C 11/0619 384/203 |
| 4,695,182 | A | * | 9/1987 | Wood, Jr. ............ F16C 11/0604 403/133 |
| 5,887,859 | A | | 3/1999 | Hadano et al. |
| 9,695,869 | B2 | * | 7/2017 | Blachon ................ F16C 23/046 |
| 2002/0001503 | A1 | | 1/2002 | Jager |
| 2003/0022720 | A1 | * | 1/2003 | Takei ...................... G01M 1/24 464/69 |
| 2006/0199650 | A1 | | 9/2006 | Schneider et al. |
| 2007/0009320 | A1 | | 1/2007 | Duerre et al. |
| 2016/0003293 | A1 | * | 1/2016 | Blachon ................ F16C 23/046 384/212 |

FOREIGN PATENT DOCUMENTS

| | | |
|---|---|---|
| DE | 9216981 U1 | 3/1993 |
| DE | 19609773 C1 | 8/1997 |
| DE | 10011124 C2 | 9/2001 |
| DE | 10031589 A1 | 1/2002 |
| DE | 10039808 A1 | 2/2002 |
| DE | 10348787 B3 | 11/2004 |
| DE | 102005029741 A1 | 1/2007 |
| WO | WO 2004097239 A | 11/2004 |

\* cited by examiner

CENTERING SLEEVE FOR BEARING AND CENTERING A SHAFT END

CROSS-REFERENCE TO PRIOR APPLICATIONS

This application is a U.S. National Stage Application under 35 U.S.C. § 371 of International Application No. PCT/EP2015/061612 filed on May 26, 2015, and claims benefit to German Patent Application No. DE 10 2014 107 483.1 filed on May 27, 2014. The International Application was published in German on Dec. 3, 2015 as WO 2015/181184 A1 under PCT Article 21(2).

FIELD

The present invention relates to a centering sleeve for bearing and centering a shaft end, comprising an inner bushing and an outer bushing that surrounds the inner bushing, wherein a spring element made of an elastomer is arranged between the inner bushing and the outer bushing, and wherein said spring element is provided with a sealing lip.

BACKGROUND

Centering sleeves of the above-mentioned type are used for centering and positioning a shaft end. For this purpose an accurate concentricity is required between the outer bushing and the inner bushing. In addition, a high radial rigidity is necessary for accurate positioning, as otherwise there is a risk that the shaft may drift. Further, it is necessary that the centering sleeve is provided with low cardan rigidity in order to be able to compensate a tilting motion of both of the shaft ends.

A centering sleeve, associated with a Hardy disk, is known from DE 10 2005 029 741 A1. The centering sleeve is provided with an inner bushing and an outer bushing on both of which a spherically shaped spring element from an elastomer is vulcanized. The spherical formation of the spring element ensures a high radial rigidity while providing low cardan rigidity. A sealing lip which fits into one of the shaft ends in a sealing manner projects radially inwardly from the spring element to seal the centering sleeve. Here, the disadvantage is that in the case of high cardanic angles, the sealing lip lifts from the shaft end, so that the sealing function is no longer sufficiently ensured.

To circumvent this disadvantage a centering sleeve is provided in DE 20 2013 006 359 U1 whose spring element is provided with a circumferential recess extending around a sealing lip. However, such a solution is complex, and thus expensive to manufacture. Moreover, a bonding agent to bond the spring element with the outer bushing and the inner bushing is used in the centering sleeve disclosed herein, which additionally impacts production costs.

SUMMARY

In an embodiment, the present invention provides a centering sleeve for bearing and centering a shaft end. The centering sleeve includes an inner bushing having passages. An outer bushing surrounds the inner bushing. A spring element made of an elastomer is arranged between the inner bushing and the outer bushing. The spring element has a sealing lip. The elastomer passes through the passages of the inner bushing so as to create an interlocking connection between the spring element and the inner bushing.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
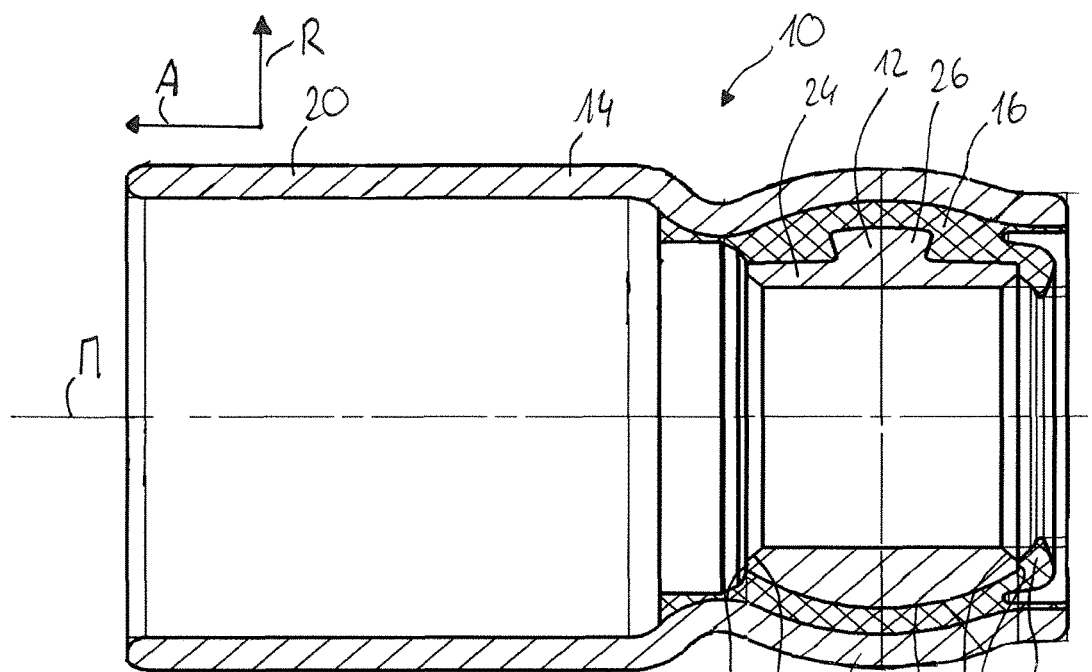
FIG. 1 a cross-section through a centering sleeve according to an embodiment of the invention.
Figure 2:
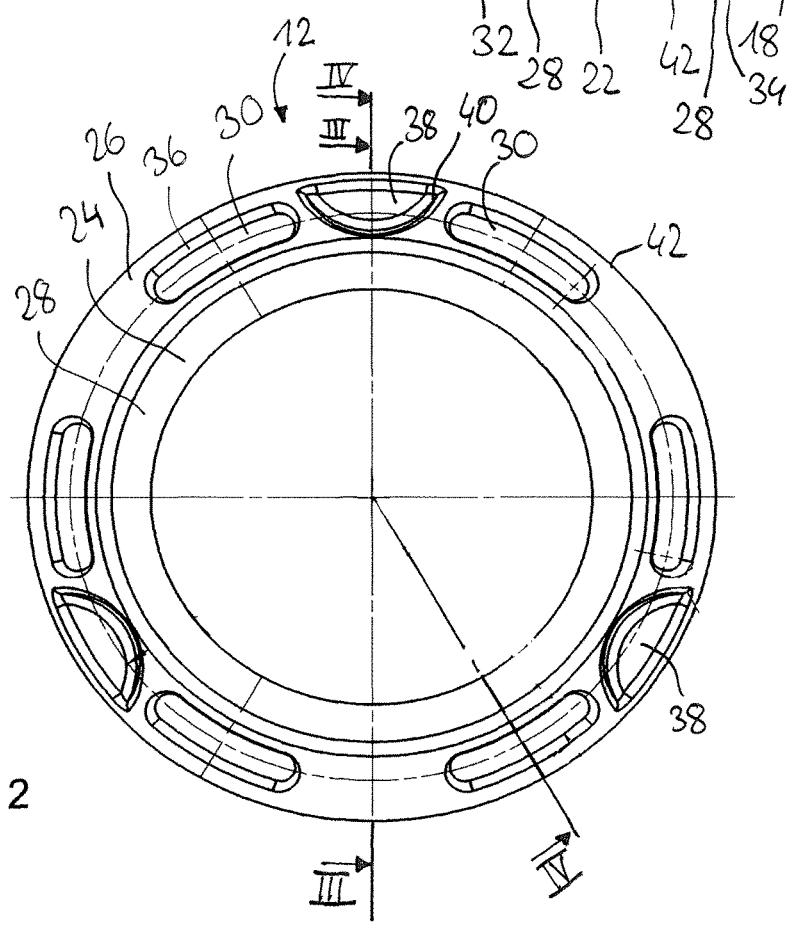
FIG. 2 a front view of an inner bushing of the centering sleeve according to an embodiment of the invention.
Figure 3:
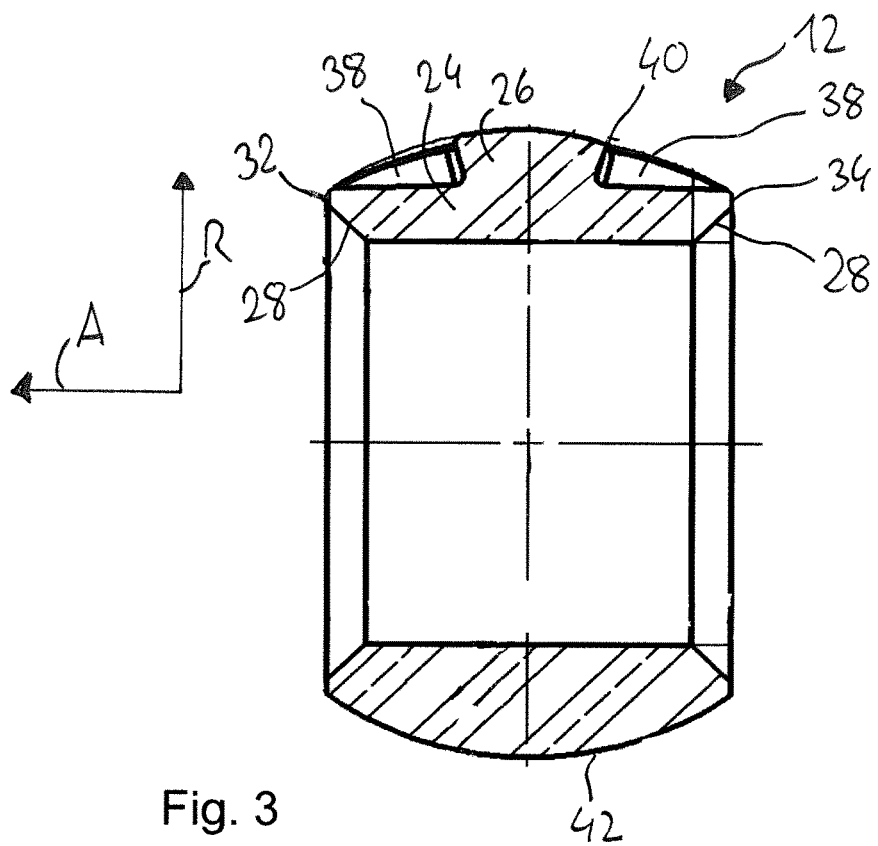
FIG. 3 a cross-section through the inner bushing along the line of FIG. 2.
Figure 4:
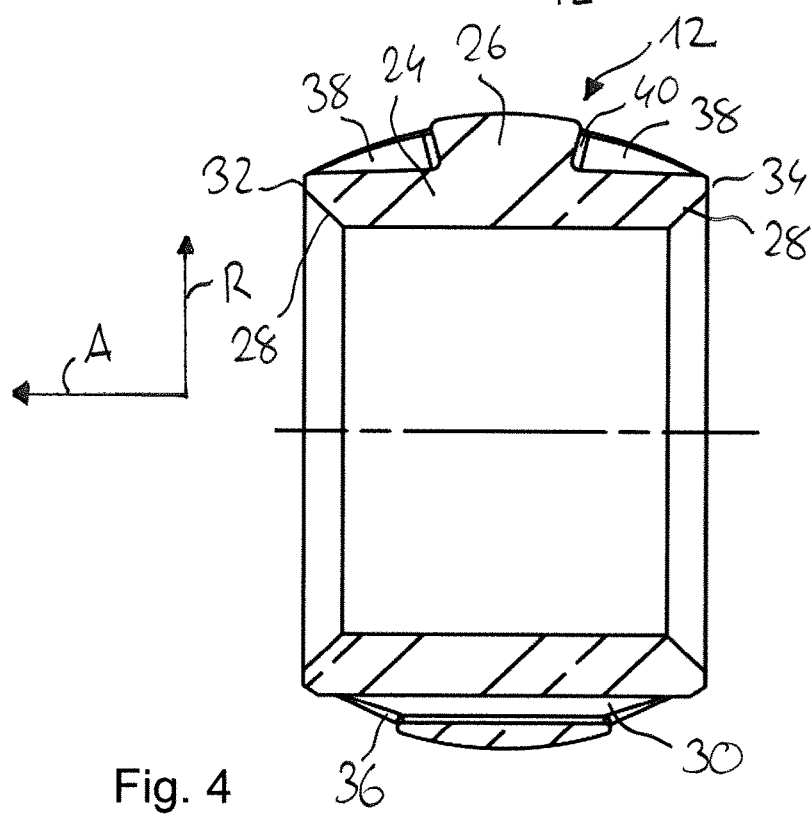
FIG. 4 a cross-section through the inner bushing along line IV-IV of FIG. 2.
Figure 5:
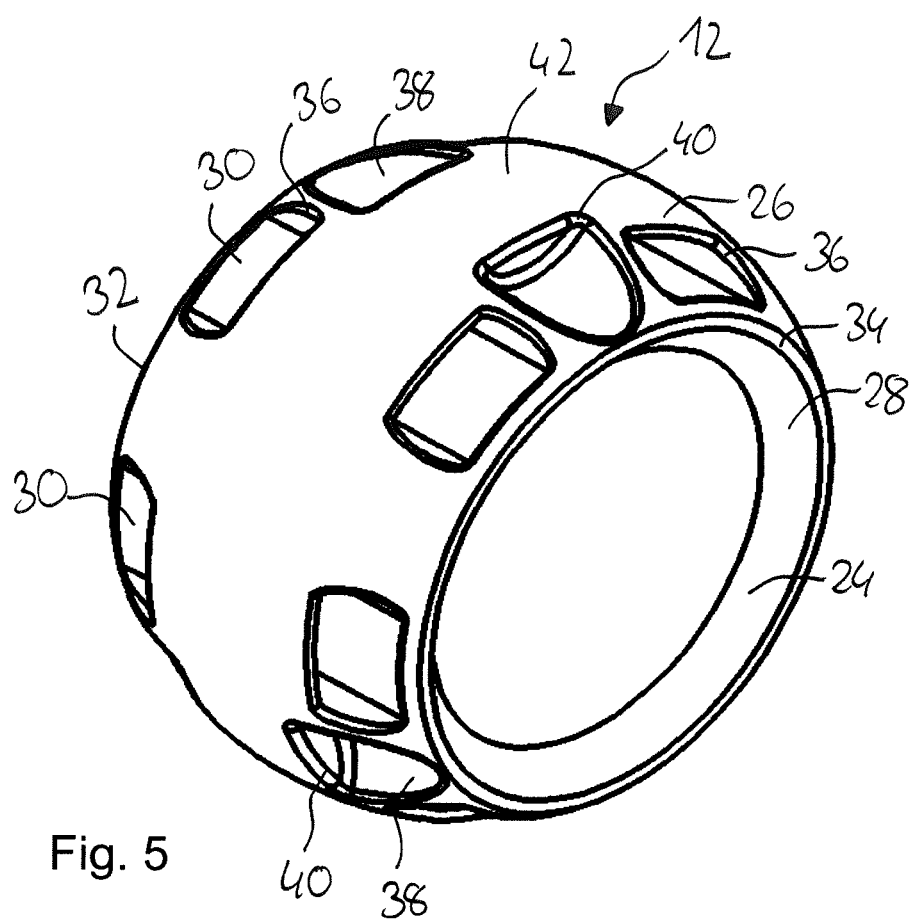
FIG. 5 a perspective view of the inner bushing of the centering sleeve according to an embodiment of the invention.

In an embodiment, the present invention provides a centering sleeve of the afore-mentioned type which ensures a reliable fit of the sealing lip on one of the shaft ends in the case of high cardanic angles and is inexpensive to manufacture.

According to an embodiment, in the centering sleeve of the afore-mentioned type, the inner bushing is provided with passages through which the elastomer passes in order to provide an interlocking connection between the spring element and the inner bushing.

In the centering sleeve according to an embodiment of the invention, the passages serve as passage openings for the elastomer so that the elastomer penetrates or passes through the passages. At the same time, the elastomer surrounds the passages on their outer circumference. Consequently, the spring element surrounds or encompasses the passages. The spring element is thus connected to the inner bushing in an interlocking manner. Thereby, it was recognized by the inventors that the sealing lip is fitted to the inner bushing in such a way that in case of a deflection of the inner bushing and an associated motion of the spring element, the sealing lip is tightened up, thus preventing the lip from lifting. Further, it was recognized that the sealing lip does not lift even at high cardanic angles or deflection angles. A reliable sealing function is ensured thereby even at high cardanic angles or deflection angles. Furthermore, as a result of the interlocking connection the use of an adhesive or binder to attach the spring element or the sealing lip to the inner bushing may be dispensed with. Consequently, the centering sleeve according to an embodiment of the invention is inexpensive to manufacture.

In a preferred embodiment the passages extend in the axial direction. Further, preferably, the passages extend parallel to a central axis of the inner bushing in the axial direction. Further, advantageously, the passages extend from a first front side of the inner bushing to a second front side of the inner bushing. Thereby, the spring element encloses the passages in the axial direction so that a sufficient adhesion is ensured in the axial direction.

In a preferred embodiment, the passages are inserted into the shell surface of the inner bushing. Herein, the shell surface may be also referred to as the outer circumferential surface of the inner bush.

The inner bushing is preferably formed of an inner bushing portion and an outer bushing portion, where the passages are introduced into the outer bushing portion. Therefore, an improved fit of the spring element and the sealing lip, in particular, is achieved on the passages. Thereby, the inner bushing is preferably integrally formed.

In a preferred embodiment, the inner bushing is provided with at least three passages. Further, preferably, the inner bushing is provided with at least six passages. Thereby, an interlocking connection of the spring element with the inner bushing is achieved. Further, it is ensured, therefore, that the sealing lip reliably fits closely to the inner bushing, even at high cardanic angles or deflection angles. Thus, a sufficient sealing function is ensured.

Preferably, the passages are arranged in equidistant intervals to one other. Thereby a uniform fit of the spring element with the sealing lip is ensured over the circumference of the inner bushing.

The passages may have approximately the shape of an elongated hole in the cross-section. Further, the passage may be formed oval, circular or rectangular in cross-section.

In a preferred embodiment, the passages are formed with a rounded border. Thus a sharp-edged transition resulting in a damage of the spring element during a motion of the inner bushing is avoided.

The inner bushing may be provided with recesses. Preferably, the recesses are introduced into the shell surface of the inner bushing or the outer bushing portion. Further, preferably, each of the recesses extends from one front side of the inner bushing inwardly in the axial direction. Preferably, recesses extend on both front sides of the inner bushing in an inward axial direction. Hereby, the recesses may be opposite to one another. The recesses may be formed approximately semicircular. Further, preferably, the recesses are provided with a rounded border, to prevent damage of the spring element during a motion of the inner bushing. Advantageously, one recess is arranged between two respective passages respectively.

The spring element is advantageously shaped spherically and has a uniform thickness. Thereby, a high radial rigidity can be achieved. Furthermore, due to the uniform thickness a simple manufacturing of the spring element can be ensured. In addition, the uniform thickness ensures that the spring element wears out evenly and the radial and cardanic rigidity is constant in the circumferential direction of the shaft.

In a preferred embodiment, the outer contour of the inner bushing is formed spherically.

In a further preference, the inner bushing is provided with at least one of the front sides comprising a circumferential bevel.

The inner bushing is preferably made of plastic. Thereby, the inner bushing is inexpensive to manufacture and has a low weight. The inner bushing can be manufactured by injection molding or extrusion.

In one preferred embodiment, the outer bushing is formed partially spherically and as a deep-drawn part. The surface of the outer bushing facing the spring element is preferably formed spherically. Deep drawing allows a cost-effective manufacture of the outer bushing. Further, the outer bushing may be produced by hydroforming or hammering.

A cross-section through a centering sleeve 10 according to an embodiment of the invention which serves for positioning and centering a shaft end is shown in FIG. 1.

The centering sleeve 10 is provided with an inner bushing 12 and an outer bushing 14 that surrounds the inner bushing 12, wherein a spring element 16 made of an elastomer is introduced between the two bushings 12,14. The spring element 16 is provided with a sealing lip 18 which projects from the spring element 16 in radial direction R towards the central axis M of the centering sleeve 10. By fitting the sealing lip 18 to the shaft end in a sealing manner, introduced into the inner bushing 12, the sealing lip 18 serves to seal the centering sleeve 10.

The outer bushing is formed with an approximately cylindrical interface portion 20 and an adjoining spherically shaped receiving portion 22. The inner bushing 12 and the spring member 16 are arranged or introduced into the receiving portion 22.

In particular, as can be seen from FIGS. 2 to 5, the inner bushing 12 is approximately ring-shaped and has a shell surface 42 which is spherically shaped in cross-section. Thereby, the inner bushing 12 is integrally formed, and further comprises an inner bushing portion 24 and an outer bushing portion 26. The inner bushing portion 24 is provided with a circumferential bevel 28 on the front sides 32, 34, respectively.

The outer bushing portion 26 comprises passages 30 which extend from a first front side 32 to a second front side 34 of the inner bushing 12 in the axial direction A. The said passages 30 are provided with a shape of an approximate elongated hole in cross-section, and are spaced apart in equidistant intervals to one another over the circumference of the inner bushing 12 and the outer bushing portion 26, respectively. In the present embodiment, six passages 30 are introduced into the outer bushing portion 26. Further, preferably, at least three passages 30 are disposed on the outer bushing portion 26. Also preferred, at least six passages 30 are introduced into the outer bushing portion 26. The passages 30 or the passage openings of the passages 30 are surrounded by a rounded border 36.

A recess 38 in the shell surface 42 of the inner bushing 12 and the outer bushing portion 26, respectively, is provided between two passages 30 on each of the front sides 32, 34 of the inner bushing 12. The recesses 38 are formed approximately semi-circularly in cross-section, and extend from the respective front side 32, 34 inwards in the axial direction A. The recesses 38 are provided with a rounded border 40.

The spring element 16 is connected to the inner bushing 12 in an interlocking manner via the passages 30 by passing the elastomer through the passages 30 and surrounding them on their outer circumference side. In addition, the passages 30 cause a close fit of the sealing lip 18 with the inner bushing 12, so that at high cardanic angles or deflection angles of the inner bushing 12 the sealing lip 18 participates in the cardanic motions of the inner bushing 12 and always fits closely on the inner bushing 12. Thereby, even at high cardanic angles a reliable sealing of the centering sleeve 10 is ensured.

The centering sleeve 10 according to an embodiment of the invention is characterized in that the inner bushing 12 is provided with passages 30, which are passed through and surrounded over their circumference by the elastomer of the spring element 16. Thereby, the passages 30 are enclosed by the spring element 16, so that the spring element 16 is connected with the inner bushing 12 in an interlocking manner. Moreover, the sealing lip 18 of the spring element 16 is attached to the inner bushing 12 via the passages 30 and recesses 38, so that at high cardanic angles or motions of the inner bushing 12 relative to the outer bushing 14 the sealing lip 18 performs the same cardanic motions. Thereby, the sealing lip 18 always fits closely on the inner bushing 12 and on the shaft end, and thus always ensures a sealing function. Thus high deflection angles with a consistent sealing function can be achieved. In addition, the use of an adhesive to connect the spring element 16 with the inner bushing 12 may be dispensed with so that the centering sleeve 10 according to the invention is inexpensive to manufacture.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE PART LIST 10 centering sleeve
12 inner bushing
14 outer bushing
16 spring element
18 sealing lip
20 interface portion
22 receiving portion
24 inner bushing portion
26 outer bushing portion
28 bevel
30 passages
32 first front side
34 second front side
36 rounded border
38 recess
40 rounded border
42 shell surface
A axial direction
R radial direction
M central axis Invention claimed is:

1. A centering sleeve for bearing and centering a shaft end, the centering sleeve comprising:

an inner bushing defining passages entirely therethrough, the passages being surrounded by the inner bushing and open at both ends of the passage;
an outer bushing that surrounds the inner bushing; and
a spring element made of an elastomer that is arranged between the inner bushing and the outer bushing, the spring element having a sealing lip, the elastomer passing through the passages of the inner bushing so as to create an interlocking connection between the spring element and the inner bushing, and
wherein the passages extend from a periphery of a first front side of the inner bushing to a periphery of a second front side of the inner bushing, and
wherein the inner bushing has at least one recess disposed in a shell surface of the inner bushing between two of the passages, the at least one recess extending only partially through the inner bushing.

2. The centering sleeve according to claim 1, wherein the passages extend in an axial direction.

3. The centering sleeve according to claim 1, wherein the inner bushing is formed of an inner bushing portion and an outer bushing portion, wherein the passages are introduced into the outer bushing portion.

4. The centering sleeve according to claim 1, wherein the inner bushing comprises at least three passages.

5. The centering sleeve according to claim 1, wherein the passages are arranged in equidistant intervals to one another.

6. The centering sleeve according to claim 1, wherein the passages have a cross-section approximately in the shape of an elongated hole.

7. The centering sleeve according to claim 1, wherein the inner bushing is provided with recesses.

8. The centering sleeve according to claim 1, wherein the spring element is formed spherically and has a uniform thickness.

9. The centering sleeve according to claim 1, wherein a shell surface of the inner bushing is formed spherically in cross-section.

10. The centering sleeve according to claim 1, wherein the inner bushing is provided with a circumferential bevel on at least one of the front sides.

11. The centering sleeve according to claim 1, wherein the inner bushing is made of plastic.

12. The centering sleeve according to claim 1, wherein the outer bushing is partially spherical and is formed as a deep-drawn part.

13. The centering sleeve according to claim 1,
wherein the first front side and the second front side each comprise a circumferential bevel connected to an outer shell surface of the inner bushing, and
wherein the periphery of the first front side is directly adjacent to the circumferential bevel in an inward axial direction toward a center of the inner bushing and at the outer shell surface, and
wherein the periphery of the second front side is directly adjacent to the circumferential bevel in the inward axial direction toward the center of the inner bushing and at the outer shell surface.

14. The centering sleeve according to claim 13, wherein the periphery of the first front side and the periphery of the second front side are each at a convex portion of the outer shell surface.

15. The centering sleeve according to claim 1, wherein the sealing lip is attached to the inner bushing via the passages and the at least one recess in an arrangement such that that sealing lip performs same cardanic motions as the inner bushing relative to the outer bushing.

16. The centering sleeve according to claim 1, wherein a recess of the at least one recess is disposed between a plurality of pairs of the passages.

17. The centering sleeve according to claim 1, wherein the at least one recess is semi-circular.

18. The centering sleeve according to claim 1, wherein a first recess of the at least one recess and a second recess of the at least one recess are opposite each other, with the first recess extending from the first front side of the inner busing inwardly in an axial direction and the second recess extending from the second front side of the inner bushing inwardly in the axial direction.

\* \* \* \* \*